(12) United States Patent
Yoneguchi et al.

(10) Patent No.: US 11,764,440 B2
(45) Date of Patent: Sep. 19, 2023

(54) NONAQUEOUS ELECTROLYTE SECONDARY BATTERY SEPARATOR

(71) Applicant: Sumitomo Chemical Company, Limited, Tokyo (JP)

(72) Inventors: Yuki Yoneguchi, Niihama (JP); Yoshinori Sato, Niihama (JP); Atsuhiro Takata, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 188 days.

(21) Appl. No.: 17/331,772

(22) Filed: May 27, 2021

(65) Prior Publication Data

US 2021/0376423 A1    Dec. 2, 2021

(30) Foreign Application Priority Data

May 28, 2020    (JP) .................................. 2020-093739

(51) Int. Cl.
| | | |
|---|---|---|
| *H01M 50/417* | (2021.01) | |
| *H01M 50/449* | (2021.01) | |
| *H01M 10/0525* | (2010.01) | |
| *H01M 4/02* | (2006.01) | |

(52) U.S. Cl.
CPC ..... *H01M 50/417* (2021.01); *H01M 10/0525* (2013.01); *H01M 50/449* (2021.01); *H01M 2004/027* (2013.01); *H01M 2004/028* (2013.01); *H01M 2300/0017* (2013.01)

(58) Field of Classification Search
CPC ............ H01M 50/417; H01M 50/449; H01M 10/0525; H01M 2004/027; H01M 2004/028; H01M 2300/0017
See application file for complete search history.

(56) References Cited

U.S. PATENT DOCUMENTS 10,014,503 B2 * 7/2018 Takata ................ H01M 50/449

FOREIGN PATENT DOCUMENTS

| JP | 9-259858 A | 10/1997 | |
|---|---|---|---|
| JP | 11-269289 A | 10/1999 | |
| WO | WO-2019074122 A1 * | 4/2019 | ............ B01D 69/12 |

* cited by examiner

*Primary Examiner* — Christopher P Domone
*Assistant Examiner* — Jonathan William Estes
(74) *Attorney, Agent, or Firm* — Panitch Schwarze Belisario & Nadel LLP

(57) ABSTRACT

A nonaqueous electrolyte secondary battery separator which has a low shutdown temperature, a high mechanical strength, and a high ion permeability is provided. The nonaqueous electrolyte secondary battery separator contains a polyolefin-based resin as a main component. The nonaqueous electrolyte secondary battery separator has a maximum heating value of not less than 30 mW/g observed during isothermal crystallization of the nonaqueous electrolyte secondary battery separator at 128° C.

10 Claims, No Drawings

NONAQUEOUS ELECTROLYTE SECONDARY BATTERY SEPARATOR

This Nonprovisional application claims priority under 35 U.S.C. § 119 on Patent Application No. 2020-093739 filed in Japan on May 28, 2020, the entire contents of which are hereby incorporated by reference.

TECHNICAL FIELD

The present invention relates to a separator for a nonaqueous electrolyte secondary battery (hereinafter referred to as a "nonaqueous electrolyte secondary battery separator").

BACKGROUND ART

Nonaqueous electrolyte secondary batteries, particularly lithium-ion secondary batteries, have a high energy density, and are therefore in wide use as batteries for personal computers, mobile telephones, portable information terminals, and the like. Such nonaqueous electrolyte secondary batteries have recently been developed as on-vehicle batteries.

A porous polyolefin film is widely used as a nonaqueous electrolyte secondary battery separator. Examples of properties which the porous polyolefin film is required to have include a low shutdown temperature, a high mechanical strength, and a high ion permeability.

In this regard, Patent Literature 1 discloses a separator microporous polyethylene film containing (i) 70% by weight to 99% by weight of polyethylene having a weight average molecular weight of not less than $5 \times 10^5$ or a composition containing the polyethylene and (ii) 1% by weight to 30% by weight of low molecular weight polyethylene having a weight average molecular weight of 1000 to 4000 and a melting point of 80° C. to 130° C. Patent Literature 2 discloses a microporous polyethylene film containing a polyethylene composition containing (i) 20% by weight to 98% by weight of polyethylene having a weight average molecular weight of not less than $5 \times 10^5$ or a composition containing the polyethylene and (ii) 2% by weight to 80% by weight of a substantially linear ethylene-α-olefin copolymer having a melting point of 95° C. to 125° C. and produced with use of a single-site catalyst.

CITATION LIST

Patent Literatures

[Patent Literature 1]
Japanese Patent Application Publication, Tokukaihei, No. 9-259858
[Patent Literature 2]
Japanese Patent Application Publication, Tokukaihei, No. 11-269289

SUMMARY OF INVENTION

Technical Problem

However, such conventional techniques as described above have left room for improvement in terms of achievement of a low shutdown temperature, a high mechanical strength, and a high ion permeability. The microporous film disclosed in Patent Literature 1 has a Gurley value as great as at least 605 s/100 mL while having a film thickness of 25 µm. The microporous polyethylene film disclosed in Patent Literature 2 has a puncture strength as low as at most 585 gf while having a film thickness of 25 µm.

An aspect of the present invention has an object to provide a nonaqueous electrolyte secondary battery separator which has a low shutdown temperature, a high mechanical strength, and a high ion permeability.

Solution to Problem

The present invention includes the following features:
<1>
A nonaqueous electrolyte secondary battery separator containing a polyolefin-based resin as a main component, the nonaqueous electrolyte secondary battery separator having a maximum heating value of not less than 30 mW/g observed during isothermal crystallization of the nonaqueous electrolyte secondary battery separator at 128° C.
<2>
The nonaqueous electrolyte secondary battery separator recited in <1>, wherein the nonaqueous electrolyte secondary battery separator contains a polyethylene-based resin as the main component.
<3>
A nonaqueous electrolyte secondary battery laminated separator including:
a nonaqueous electrolyte secondary battery separator recited in <1> or <2>; and
a porous layer disposed on one surface or on both surfaces of the nonaqueous electrolyte secondary battery separator,
the porous layer containing at least one resin that is selected from the group consisting of a meth(acrylate)-based resin, a fluorine-containing resin, a polyamide-based resin, a polyimide-based resin, a polyamideimide-based resin, a polyester-based resin, and a water-soluble polymer.
<4>
The nonaqueous electrolyte secondary battery laminated separator recited in <3>, wherein the porous layer contains an aramid resin.
<5>
A nonaqueous electrolyte secondary battery member including:
a positive electrode;
a nonaqueous electrolyte secondary battery separator recited in <1> or <2>, or a nonaqueous electrolyte secondary battery laminated separator recited in <3> or <4>; and
a negative electrode,
the positive electrode, the nonaqueous electrolyte secondary battery separator or the nonaqueous electrolyte secondary battery laminated separator, and the negative electrode being disposed in this order.
<6>
A nonaqueous electrolyte secondary battery including:
a nonaqueous electrolyte secondary battery separator recited in <1> or <2>, a nonaqueous electrolyte secondary battery laminated separator recited in <3> or <4>, or a nonaqueous electrolyte secondary battery member recited in <5>.

Advantageous Effects of Invention

An aspect of the present invention makes it possible to provide a nonaqueous electrolyte secondary battery separator which has a low shutdown temperature, a high mechanical strength, and a high ion permeability.

DESCRIPTION OF EMBODIMENTS

The following description will discuss an embodiment of the present invention. The present invention is, however, not limited to the embodiment below. The present invention is not limited to the arrangements described below, but may be altered in various ways by a skilled person within the scope of the claims. Any embodiment based on a proper combination of technical means disclosed in different embodiments is also encompassed in the technical scope of the present invention. Note that numerical expressions such as "A to B" herein mean "not less than A and not more than B" unless otherwise stated.

[1. Nonaqueous Electrolyte Secondary Battery Separator]

A nonaqueous electrolyte secondary battery separator in accordance with an aspect of the present invention contains a polyolefin-based resin as a main component, the nonaqueous electrolyte secondary battery separator having a maximum heating value of not less than 30 mW/g observed during isothermal crystallization of the nonaqueous electrolyte secondary battery separator at 128° C. The inventors of the present invention found that a nonaqueous electrolyte secondary battery separator which has a high parameter, i.e., "maximum heating value observed during isothermal crystallization at 128° C." has a low shutdown temperature, a high mechanical strength, and a high ion permeability.

The "maximum heating value observed during isothermal crystallization at 128° C." is herein measured by carrying out differential scanning calorimetry in the order described below. Specifically, in a DSC curve obtained in step 4, the height (mW/g) of a maximum peak of heat generation caused by crystallization is the "maximum heating value observed during isothermal crystallization at 128° C.".

Step 1: The temperature is raised from 30° C. to 180° C. at 10° C./min.

Step 2: The temperature is maintained at 180° C. for 5 minutes.

Step 3: The temperature is lowered from 180° C. to 128° C. at 10° C./min.

Step 4: The temperature is maintained at 128° C. for 480 minutes.

It is unclear specifically how the maximum heating value observed during isothermal crystallization at 128° C. and a property of the nonaqueous electrolyte secondary battery separator are related to each other. It is hypothetically considered that a primary structure of a polyolefin molecule greatly influences a "DSC curve obtained by carrying out isothermal crystallization at 128° C.".

Specifically, a crystallization temperature at which a polyolefin-based resin (in particular, a polyethylene-based resin) from which the nonaqueous electrolyte secondary battery separator is made is crystallized under a quenching condition (at approximately 10° C./min) is approximately 115±5° C. Thus, the polyolefin-based resin which is crystallized under an isothermal condition at 128° C., which is slightly higher than the crystallization temperature, is slowly crystallized. It is therefore considered that the primary structure (molecular weight, degree of branching, etc.) of the polyolefin-based resin has more influences on the DSC curve obtained by isothermal crystallization at 128° C. In contrast, the polyolefin-based resin is crystallized under the quenching condition (at approximately 10° C./min) in ordinary differential scanning calorimetry. It is therefore considered that the primary structure of the polyolefin-based resin has fewer influences on the DSC curve obtained.

A nonaqueous electrolyte secondary battery separator in accordance with an embodiment of the present invention has a maximum heating value of not less than 30 mW/g, more preferably not less than 40 mW/g, even more preferably not less than 45 mW/g, and still more preferably not less than 50 mW/g, observed during isothermal crystallization at 128° C.

The maximum heating value observed during isothermal crystallization at 128° C. has an upper limit which is not particularly limited, but is, for example, not more than 100 mW/g.

The nonaqueous electrolyte secondary battery separator is subjected to differential scanning calorimetry as below. Specifically, a predetermined weight of the nonaqueous electrolyte secondary battery separator is cut out and placed in an aluminum pan so as to be subjected to measurement. The nonaqueous electrolyte secondary battery separator which is a nonaqueous electrolyte secondary battery laminated separator including a porous layer is subjected to differential scanning calorimetry after the porous layer is peeled off. Example of a method of peeling off the porous layer include a method of peeling off the porous layer by applying a peel-off tape to a surface of the nonaqueous electrolyte secondary battery laminated separator, on which surface the porous layer is provided, so as to peel off the porous layer. Alternatively, the porous layer which is water-soluble can be peeled off from the nonaqueous electrolyte secondary battery laminated separator by washing with water.

The nonaqueous electrolyte secondary battery separator in accordance with an embodiment of the present invention has a melting point of preferably 136±7° C., and more preferably 138±5° C. In a case where the melting point is within the above range, a feature of the primary structure of the polyolefin-based resin is sufficiently demonstrated in the DSC curve obtained during isothermal crystallization of the nonaqueous electrolyte secondary battery separator at 128° C. The nonaqueous electrolyte secondary battery separator in accordance with an embodiment of the present invention has an enthalpy of fusion of preferably not less than 180 J/g, and more preferably not less than 210 J/g. In a case where the enthalpy of fusion is within the above range, the polyolefin-based resin can be said to have a sufficient degree of crystallinity. This makes it possible to calculate a parameter concerning isothermal crystallization with sufficiently high accuracy. The melting point and the enthalpy of fusion of the nonaqueous electrolyte secondary battery separator are measured by differential scanning calorimetry. For examples of a more specific method of the measurement, see Examples described later.

[Polyolefin-Based Resin]

The expression "containing a polyolefin-based resin as a main component" herein means that the polyolefin-based resin accounts for not less than 50% by volume of the entire material of the nonaqueous electrolyte secondary battery separator. This proportion is preferably not less than 90% by volume, and more preferably not less than 95% by volume.

The polyolefin-based resin, which the nonaqueous electrolyte secondary battery separator contains as the main component, is not particularly limited. Examples of a unit constituting the polyolefin-based resin include units derived from olefin-based monomers such as ethylene, propylene, 1-butene, 4-methyl-1-pentene, and 1-hexene. The polyolefin-based resin can be composed of a unit derived from only one kind of olefin-based monomer, or can be composed of a unit derived from two or more kinds of olefin-based monomers. Examples of the polyolefin-based resin which is a homopolymer include polyethylene, polypropylene, and polybutene. Examples of the polyolefin-based resin which is a copolymer include an ethylene-propylene copolymer. The nonaqueous electrolyte secondary battery separator can contain only one or two or more of the polyolefin-based resins listed above.

According to an embodiment of the present invention, the nonaqueous electrolyte secondary battery separator contains a polyethylene-based resin as a main component. The expression "containing a polyethylene-based resin as a main component" herein means that the polyethylene-based resin accounts for not less than 50% by volume of the entire material of the nonaqueous electrolyte secondary battery separator. This proportion is preferably not less than 90% by volume, and more preferably not less than 95% by volume. The nonaqueous electrolyte secondary battery separator which contains the polyethylene-based resin as the main component tends to have a lower shutdown temperature.

Examples of the polyethylene-based resin include low-density polyethylene, high-density polyethylene, ultra-high molecular weight polyethylene, and linear polyethylene (an ethylene-α-olefin copolymer).

In order to control the maximum heating value observed during isothermal crystallization at 128° C., it is possible to, for example, adjust the molecular weight or a degree of branching of the polyolefin-based resin. Mixing of the polyolefin-based resin having a low molecular weight tends to increase the maximum heating value. Alternatively, lowering of the degree of branching of the polyolefin-based resin tends to increase the maximum heating value.

According to an embodiment of the present invention, the polyolefin-based resin is a mixture of an ultra-high molecular weight component and a low molecular weight component. The ultra-high molecular weight component has a weight average molecular weight whose upper limit is preferably not more than 6 million, more preferably not more than 5.5 million, and even more preferably not more than 5 million. The ultra-high molecular weight component has a weight average molecular weight whose lower limit is preferably not less than 1.5 million, more preferably not less than 1.8 million, and even more preferably not less than 2 million. The ultra-high molecular weight component whose weight average molecular weight is set within the above range allows the nonaqueous electrolyte secondary battery separator to have both a high puncture strength and excellent processability.

The low molecular weight component has a weight average molecular weight whose upper limit is preferably not more than 10000. The low molecular weight component has a weight average molecular weight whose lower limit is preferably not less than 1500, and more preferably not less than 2000. The low molecular weight component whose weight average molecular weight is set within the above range is highly dispersible to the ultra-high molecular weight component. The low molecular weight component has a melting point of preferably not less than 115° C., more preferably not less than 120° C., and even more preferably not less than 125° C. The low molecular weight component whose melting point is set within the above range allows the resultant polyolefin-based resin to have a higher maximum heating value.

The ultra-high molecular weight component and the low molecular weight component are mixed at a ratio of preferably (95:5) to (50:50), more preferably (90:10) to (55:45), and even more preferably from (85:15) to (60:40). According to an embodiment of the present invention, the ultra-high molecular weight component and the low molecular weight component in total account for preferably not less than 70% by weight, more preferably not less than 80% by weight, and even more preferably not less than 90% by weight of the entire polyolefin-based resin.

Regarding the degree of branching of the polyethylene-based resin, the polyethylene-based resin has preferably not more than 10 branches, more preferably not more than 8 branches, and even more preferably not more than 5 branches, per 10000 carbon atoms of its main chain. Note here that the degree of branching matters in the polyethylene-based resin which has a weight average molecular weight of not less than 1 million.

[Method for Producing Nonaqueous Electrolyte Secondary Battery Separator]

The nonaqueous electrolyte secondary battery separator can be produced by a publicly known method for producing a porous polyolefin film. As disclosed in Japanese Patent Publication No. 5,476,844, the method is exemplified by a method in which a polyolefin-based resin to which a pore-forming agent is added is formed into a film, and then the pore-forming agent is removed.

Specific examples of the method include a production method including the following steps of:

(1) kneading 100 parts by weight of a polyolefin-based resin with 120 parts by weight to 240 parts by weight of a pore-forming agent (such as calcium carbonate) so as to obtain a mixture;
(2) forming the mixture obtained in (1) into a film;
(3) removing the pore-forming agent from the film obtained in (2); and
(4) stretching the film obtained in (3).

The nonaqueous electrolyte secondary battery separator has a film thickness of preferably 5 μm to 20 μm, more preferably 7 μm to 15 μm, and even more preferably 9 μm to 15 μm. The film thickness which is not less than 5 μm makes it possible to satisfactorily achieve a function (such as the shutdown function) which the nonaqueous electrolyte secondary battery separator is required to have. The film thickness which is not more than 20 μm makes it possible to achieve a thinner nonaqueous electrolyte secondary battery separator.

The nonaqueous electrolyte secondary battery separator has a weight per unit area of preferably 4 $g/m^2$ to 20 $g/m^2$, and more preferably 5 $g/m^2$ to 12 $g/m^2$. The weight per unit area which is within the above range achieves a sufficiently high weight energy density and a sufficiently high volume energy density for the nonaqueous electrolyte secondary battery.

The nonaqueous electrolyte secondary battery separator has a shutdown temperature of preferably not more than 150° C., more preferably not more than 146° C., and even more preferably not more than 144° C. The shutdown temperature which is within the above range makes it possible to achieve sufficient safety against thermal runaway of the nonaqueous electrolyte secondary battery.

The nonaqueous electrolyte secondary battery separator which has a film thickness of 13 μm has a puncture strength of preferably not less than 350 gf/13 μm, and more preferably not less than 380 gf/13 μm. The nonaqueous electrolyte secondary battery separator which has a puncture strength in the above range is sufficiently mechanically strong against an external force applied to the nonaqueous electrolyte secondary battery. In a case where the nonaqueous electrolyte secondary battery separator which has a film thickness of X μm has a puncture strength of Y, the equation "Y'=Y×(13/X)" can be used to convert Y into a puncture strength Y' obtained by converting the film thickness from X μm into 13 μm. In a case where the nonaqueous electrolyte secondary battery separator is a nonaqueous electrolyte secondary battery laminated separator including the nonaqueous electrolyte secondary battery separator and a porous layer disposed on one surface or on both surfaces of the nonaqueous electrolyte secondary battery separator, the film thickness and the puncture strength which are measured after the porous layer is peeled off can be X and Y, respectively, in the above equation.

The nonaqueous electrolyte secondary battery separator has an air permeability, as represented by a Gurley value, of preferably 50 s/100 mL to 350 s/100 mL, more preferably 50 s/100 mL to 300 s/100 mL, and even more preferably 100 s/100 mL to 250 s/100 mL. The nonaqueous electrolyte secondary battery separator which has an air permeability in the above range can be said to have a sufficient ion permeability.

The nonaqueous electrolyte secondary battery separator has a porosity of preferably 20% by volume to 80% by volume, and more preferably 30% by volume to 75% by volume. The porosity which is within the above range allows electrolyte to be retained in a larger amount and makes it possible to shut down an excessively large current at a lower temperature.

The nonaqueous electrolyte secondary battery separator has pores whose size is preferably not more than 0.1 μm, and more preferably not less than 0.02 μm. The pores whose size is within the above range (i) allow the nonaqueous electrolyte secondary battery separator to have a sufficient ion permeability and (ii) make it possible to more sufficiently prevent particles constituting the electrode from entering the nonaqueous electrolyte secondary battery separator.

[2. Nonaqueous Electrolyte Secondary Battery Laminated Separator]

The nonaqueous electrolyte secondary battery laminated separator in accordance with an aspect of the present invention includes the nonaqueous electrolyte secondary battery separator (described earlier) and a porous layer disposed on one surface or on both surfaces of the nonaqueous electrolyte secondary battery separator. According to an embodiment of the present invention, the porous layer contains a filler and a resin.

[Filler]

Examples of a type of filler include an organic filler and an inorganic filler.

Examples of the organic filler include fillers made of (i) a homopolymer of a monomer such as styrene, vinyl ketone, acrylonitrile, methyl methacrylate, ethyl methacrylate, glycidyl methacrylate, glycidyl acrylate, or methyl acrylate, or (ii) a copolymer of two or more of such monomers; a fluorine-based resin such as polytetrafluoroethylene, an ethylene tetrafluoride-propylene hexafluoride copolymer, an ethylene tetrafluoride-ethylene copolymer, or polyvinylidene fluoride; a melamine resin; an urea resin; polyolefin; or polymethacrylate. These organic fillers each can be used solely, or a mixture of two or more thereof can be alternatively used. Among these organic fillers, polytetrafluoroethylene powder is preferable due to its chemical stability.

Examples of the inorganic filler include materials made of an inorganic matter such as a metal oxide, a metal nitride, a metal carbide, a metal hydroxide, a carbonate, or a sulfate. Specific examples of the inorganic filler include alumina powder, boehmite powder, silica powder, titanium dioxide powder, aluminum hydroxide powder, and calcium carbonate powder. These inorganic fillers each can be used solely, or a mixture of two or more thereof can be alternatively used. Among these inorganic fillers, alumina powder is preferable due to its chemical stability.

Examples of the shape of the filler include a substantially spherical shape, a plate shape, a columnar shape, a needle shape, a whisker shape, and a fibrous shape. These shapes can be applied to any particles. Substantially spherical particles, which make it easy to form uniform pores, are preferable.

The filler content in the porous layer is preferably 1% by weight to 60% by weight, more preferably 10% by weight to 50% by weight, and even more preferably 20% by weight to 50% by weight. Note that the filler content in the porous layer is calculated assuming that the total weight of the porous layer is 100% by weight. The filler content which is set within the above range makes it possible to prevent or reduce an increase in weight of the porous layer and to achieve a separator which has a good ion permeability.

The filler contained in the porous layer has an average particle diameter of preferably 0.01 μm to 2.0 μm, and more preferably 0.05 μm to 1.0 μm. The "average particle diameter of the filler" herein means a volume-based average particle diameter (D50) of the filler. D50 means a particle diameter having a value at which a cumulative value of 50% is reached in a volume-based particle size distribution. D50 can be measured with use of, for example, a laser diffraction particle size analyzer (product name: SALD2200, etc. manufactured by Shimadzu Corporation).

[Resin]

A resin which is contained in the porous layer has a function of (i) bonding components of the porous layer to each other and/or (ii) bonding the porous layer and a porous polyolefin film and/or the porous layer and an electrode plate.

The resin which is contained in the porous layer is preferably a resin which is insoluble in the electrolyte of the battery and which is electrochemically stable when the battery is in normal use.

Examples of the resin which is contained in the porous layer include polyolefins; meth(acrylate)-based resins; fluorine-containing resins; polyamide-based resins; polyimide-based resins; polyamideimide-based resins; polyester-based resins; rubbers; resins each having a melting point or a glass transition temperature of not less than 180° C.; water-soluble polymers; and polycarbonate, polyacetal, and polyether ether ketone.

Among the above resins, meth(acrylate)-based resins, fluorine-containing resins, polyamide-based resins, polyimide-based resins, polyamideimides, polyester-based resins, and water-soluble polymers are preferable.

Preferable examples of the polyolefins include polyethylene, polypropylene, polybutene, and an ethylene-propylene copolymer.

Examples of the fluorine-containing resins include polyvinylidene fluoride (PVDF), polytetrafluoroethylene, a vinylidene fluoride-hexafluoropropylene copolymer, a tetrafluoroethylene-hexafluoropropylene copolymer, a tetrafluoroethylene-perfluoroalkylvinyl ether copolymer, a vinylidene fluoride-tetrafluoroethylene copolymer, a vinylidene fluoride-trifluoroethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and an ethylene-tetrafluoroethylene copolymer. The fluorine-containing resins listed above are particularly exemplified by a fluorine-containing rubber having a glass transition temperature of not more than 23° C.

Preferable examples of the polyamide-based resins include aramid resins such as aromatic polyamides and wholly aromatic polyamides.

Specific examples of the aramid resins include poly(paraphenylene terephthalamide), poly(metaphenylene isophthalamide), poly(parabenzamide), poly(metabenzamide), poly(4,4'-benzanilide terephthalamide), poly(paraphenylene-4,4'-biphenylene dicarboxylic acid amide), poly(metaphenylene-4,4'-biphenylene dicarboxylic acid amide), poly(paraphenylene-2,6-naphthalene dicarboxylic acid amide), poly(metaphenylene-2,6-naphthalene dicarboxylic acid amide), poly(2-chloroparaphenylene terephthalamide), a paraphenylene terephthalamide/2,6-dichloroparaphenylene terephthalamide copolymer, and a metaphenylene terephthalamide/2,6-dichloroparaphenylene terephthalamide copolymer. Among the above aramid resins, poly(paraphenylene terephthalamide) is more preferable.

The polyester-based resins are preferably aromatic polyesters such as polyarylates, and liquid crystal polyesters.

Examples of the rubbers include a styrene-butadiene copolymer and a hydride thereof, a methacrylate ester copolymer, an acrylonitrile-acrylic ester copolymer, a styrene-acrylic ester copolymer, ethylene propylene rubber, and polyvinyl acetate.

Examples of the resins each having a melting point or a glass transition temperature of not less than 180° C. include polyphenylene ether, polysulfone, polyether sulfone, polyphenylene sulfide, polyetherimide, polyamide imide, and polyether amide.

Examples of the water-soluble polymers include polyvinyl alcohol, polyethylene glycol, cellulose ether, sodium alginate, polyacrylic acid, polyacrylamide, and polymethacrylic acid.

Note that the above resins each of which is to be contained in the porous layer can be used in one kind or in combination of two or more kinds.

[Method for Producing Nonaqueous Electrolyte Secondary Battery Laminated Separator]

A coating solution obtained by dissolving or dispersing the resin, the filler, and optionally other component(s) in a solvent can be used to form the porous layer. Examples of a method of forming the coating solution include a mechanical stirring method, an ultrasonic dispersion method, a high-pressure dispersion method, and a media dispersion method. Examples of the solvent which can be used include N-methylpyrrolidone, N,N-dimethylacetamide, and N,N-dimethylformamide.

The porous layer can be formed by, for example, the following method. Specifically, the coating solution (described earlier) is prepared, and the porous polyolefin film is coated with the coating solution and dried, so that the porous layer is formed.

A method of coating the porous polyolefin film with the coating solution include publicly known coating methods such as a knife coater method, a blade coater method, a bar coater method, a gravure coater method, and a die coater method.

A method of removing the solvent (dispersion medium) is commonly a drying method. Examples of the drying method include natural drying, air-blow drying, heat drying, and drying under reduced pressure. Note, however, that the solvent (dispersion medium) can be removed by any method that allows the solvent (dispersion medium) to be removed sufficiently. Note also that drying can be carried out after the solvent (dispersion medium) contained in the coating solution is replaced with another solvent. Specific examples of a method in which the solvent (dispersion medium) is removed after being replaced with another solvent include the following method. Specifically, the solvent (dispersion medium) is replaced with a poor solvent having a low boiling point, such as water, alcohol, or acetone, the porous layer is deposited, and then the drying is carried out.

[3. Nonaqueous Electrolyte Secondary Battery Member and Nonaqueous Electrolyte Secondary Battery]

A nonaqueous electrolyte secondary battery member in accordance with an embodiment of the present invention includes a positive electrode, the nonaqueous electrolyte secondary battery laminated separator (or nonaqueous electrolyte secondary battery separator) described earlier, and a negative electrode, the positive electrode, the nonaqueous electrolyte secondary battery laminated separator (or nonaqueous electrolyte secondary battery separator) described earlier, and the negative electrode being disposed in this order. A nonaqueous electrolyte secondary battery in accordance with an embodiment of the present invention includes the nonaqueous electrolyte secondary battery laminated separator (or nonaqueous electrolyte secondary battery separator) described earlier. The nonaqueous electrolyte secondary battery ordinarily has a structure in which the negative electrode and the positive electrode face each other via the nonaqueous electrolyte secondary battery laminated separator (or nonaqueous electrolyte secondary battery separator) described earlier. According to the nonaqueous electrolyte secondary battery, a battery element including (i) the structure and (ii) an electrolyte with which the structure is impregnated is enclosed in an exterior member. The nonaqueous electrolyte secondary battery is, for example, a lithium ion secondary battery which achieves an electromotive force through doping and dedoping with lithium ions.

[Positive Electrode]

Examples of the positive electrode include a positive electrode sheet having a structure in which an active material layer containing a positive electrode active material and a binding agent is formed on a current collector. The active material layer can further contain an electrically conductive agent.

Examples of the positive electrode active material include a material capable of being doped and dedoped with lithium ions. Examples of such a material include a lithium complex oxide containing at least one transition metal such as V, Mn, Fe, Co, or Ni.

Examples of the electrically conductive agent include carbonaceous materials such as natural graphite, artificial graphite, cokes, carbon black, pyrolytic carbons, carbon fiber, and a fired product of an organic polymer compound.

Examples of the binding agent include thermoplastic resins such as polyvinylidene fluoride, a copolymer of vinylidene fluoride, polytetrafluoroethylene, a copolymer of vinylidene fluoride-hexafluoropropylene, a copolymer of tetrafluoroethylene-hexafluoropropylene, a copolymer of tetrafluoroethylene-perfluoroalkyl vinyl ether, a copolymer of ethylene-tetrafluoroethylene, a copolymer of vinylidene fluoride-tetrafluoroethylene, a copolymer of vinylidene fluoride-trifluoroethylene, a copolymer of vinylidene fluoride-trichloroethylene, a copolymer of vinylidene fluoride-vinyl fluoride, a copolymer of vinylidene fluoride-hexafluoropropylene-tetrafluoroethylene, a thermoplastic polyimide, polyethylene, and polypropylene; acrylic resins; and styrene-butadiene rubber. Note that the binding agent serves also as a thickener.

Examples of the positive electrode current collector include electric conductors such as Al, Ni, and stainless steel. Among these, Al is preferable because Al is easily processed into a thin film and is inexpensive.

The positive electrode which is in a sheet form can be produced by, for example, a method of applying a pressure to the positive electrode active material, the electrically conductive agent, and the binding agent active material on the positive electrode current collector to form a positive electrode mix thereon; or a method of (i) using an appropriate organic solvent to make the positive electrode active material, the electrically conductive material, and the binding agent in a paste form so as to provide a positive electrode mix, (ii) applying the positive electrode mix to the positive electrode current collector, (iii) drying the applied positive electrode mix to prepare a sheet-like positive electrode mix, and (iv) applying a pressure to the sheet-like positive electrode mix so that the sheet-like positive electrode mix is firmly fixed to the positive electrode current collector.

[Negative Electrode]

Examples of the negative electrode include a negative electrode sheet having a structure in which an active material layer containing a negative electrode active material and a binding agent is formed on a current collector. The active material layer can further contain an electrically conductive agent.

Examples of the negative electrode active material include (i) a material capable of being doped and dedoped with lithium ions, (ii) a lithium metal, and (iii) a lithium alloy. Examples of the material include carbonaceous materials such as natural graphite, artificial graphite, cokes, carbon black, pyrolytic carbons, carbon fiber, and a fired product of an organic polymer compound; chalcogen compounds such as an oxide and a sulfide which are doped and dedoped with lithium ions at an electric potential lower than that of the positive electrode; metals such as aluminum (Al), lead (Pb), tin (Sn), bismuth (Bi), and silicon (Si), each of which is alloyed with alkali metal; an intermetallic compound (AlSb, $Mg_2Si$, $NiSi_2$) of a cubic system in which intermetallic compound alkali metal can be inserted in a space in a lattice; and a lithium nitrogen compound ($Li_3$-$xM_xN$ (where M represents a transition metal)).

Examples of the negative electrode current collector include Cu, Ni, and stainless steel. Among these, Cu is preferable because Cu is not easily alloyed with lithium particularly in the case of a lithium ion secondary battery and is easily processed into a thin film.

The negative electrode which is in a sheet form can be produced by, for example, a method of applying a pressure to the negative electrode active material on the negative electrode current collector to form a negative electrode mix thereon; or a method of (i) using an appropriate organic solvent to make the negative electrode active material in a paste form so as to provide a negative electrode mix, (ii) applying the negative electrode mix to the negative electrode current collector, (iii) drying the applied negative electrode mix to prepare a sheet-like negative electrode mix, and (iv) applying a pressure to the sheet-like negative electrode mix so that the sheet-like negative electrode mix is firmly fixed to the negative electrode current collector. The paste preferably includes the electrically conductive agent and the binding agent.

[Nonaqueous Electrolyte]

The nonaqueous electrolyte can be, for example, a non-aqueous electrolyte containing an organic solvent and a lithium salt dissolved in the organic solvent. Examples of the lithium salt include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. It is preferable to use, among the above lithium salts, at least one fluorine-containing lithium salt selected from the group consisting of $LiPF_6$, $LiAsF_6$, $LiSbF_6$, $LiBF_4$, $LiCF_3SO_3$, $LiN(CF_3SO_2)_2$, and $LiC(CF_3SO_2)_3$.

Examples of the organic solvent include carbonates such as ethylene carbonate, propylene carbonate, dimethyl carbonate, diethyl carbonate, ethyl methyl carbonate, 4-trifluoromethyl-1,3-dioxolane-2-on, and 1,2-di(methoxycarbonyloxy)ethane; ethers such as 1,2-dimethoxyethane, 1,3-dimethoxypropane, pentafluoropropyl methylether, 2,2,3,3-tetrafluoropropyl difluoromethylether, tetrahydrofuran, and 2-methyl tetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propane sultone; and fluorine-containing organic solvents prepared by introducing a fluorine group into the organic solvents listed above. Among the above organic solvents, carbonates are preferable. A mixed solvent of a cyclic carbonate and an acyclic carbonate or a mixed solvent of a cyclic carbonate and an ether is further preferable. The mixed solvent of a cyclic carbonate and an acyclic carbonate is further preferably a mixed solvent of ethylene carbonate, dimethyl carbonate, and ethyl methyl carbonate. Such a mixed solvent allows a wider operating temperature range, and is not easily decomposed even in a case where the negative electrode active material is a graphite material such as natural graphite or artificial graphite.

[Method for Producing Nonaqueous Electrolyte Secondary Battery Member and Method for Nonaqueous Electrolyte Secondary Battery]

The nonaqueous electrolyte secondary battery member can be produced by, for example, a method in which the positive electrode, the nonaqueous electrolyte secondary battery laminated separator (or nonaqueous electrolyte secondary battery separator) described earlier, and the negative electrode are disposed in this order.

The nonaqueous electrolyte secondary battery can be produced by, for example, the following method. Specifically, first, the nonaqueous electrolyte secondary battery member is placed in a container serving as a housing of nonaqueous electrolyte secondary battery. Next, the container is filled with the nonaqueous electrolyte and then hermetically sealed under reduced pressure. Thus, the nonaqueous electrolyte secondary battery can be produced.

The present invention is not limited to the embodiments, but can be altered by a skilled person in the art within the scope of the claims. The present invention also encompasses, in its technical scope, any embodiment derived by combining technical means disclosed in differing embodiments.

EXAMPLES

The following description will more specifically discuss the present invention with reference to Examples and Comparative Examples. Note, however, that the present invention is not limited to the Examples.

[Measurement Method]

(1) Maximum Heating Value, Enthalpy of Fusion, and Melting Point

A differential scanning calorimeter (product name: EXSTAR DSC 7020, manufactured by SII Nano Technology Inc.) was used to obtain a DSC curve of a polyolefin-based resin-containing composition (free from calcium carbonate, which is a pore-forming agent) not having been subjected to film formation (a specific differential scanning calorimetry process is as described below). A change in DSC curve caused by the film formation is so minor as to be negligible. Thus, the DSC curve which is obtained in this measurement can be regarded as a DSC curve of a nonaqueous electrolyte secondary battery separator obtained through the film formation.

Step 1: The temperature is raised from 30° C. to 180° C. at 10° C./min.

Step 2: The temperature is maintained at 180° C. for 5 minutes.

Step 3: The temperature is lowered from 180° C. to 128° C. at 10° C./min.

Step 4: The temperature is maintained at 128° C. for 480 minutes.

Step 5: The temperature is lowered from 128° C. to 30° C. at 10° C./min.

Step 6: The temperature is maintained at 30° C. for 3 minutes.

Step 7: The temperature is raised from 30° C. to 180° C. at 10° C./min.

In the DSC curve obtained in the step 4, the height of a maximum peak of heat generation caused by crystallization was regarded as a "maximum heating value (mW/g)". In the DSC curve obtained in the step 7, an area surrounded by (i) a peak caused by melting and (ii) a base line was regarded as an "enthalpy of fusion (J/g)". In the DSC curve obtained in the step 7, a temperature at which a maximum peak of heat absorption caused by melting appears was regarded as a "melting point (° C.)".

(2) Film Thickness

A high-resolution digital measuring device manufactured by Mitutoyo Corporation was used to measure the film thickness of the nonaqueous electrolyte secondary battery separator.

(3) Weight Per Unit Area

A sample of 8 cm×8 cm was cut out from the nonaqueous electrolyte secondary battery separator to measure the weight W (g) thereof. Next, the weight per unit area (g/m$^2$) of the nonaqueous electrolyte secondary battery separator was calculated based on the following equation: Weight per unit area=W/(0.08×0.08)

(4) Shutdown Temperature

A sample having a diameter of 19.4 mm was cut out from the nonaqueous electrolyte secondary battery separator. This sample was assembled with members of a 2032-type coin cell (manufactured by Hohsen Corp.). First, the members are sequentially disposed from top to bottom so as to have the structure below. Next, the members thus disposed are hermetically sealed with use of a coin cell caulking machine (manufactured by Hohsen Corp.) to produce a coin cell for measurement.

Upper lid
Aluminum ring (having an outer diameter of 16 mm, an inner diameter of 10 mm, and a thickness of 1.6 mm)
Spacer (a circular spacer having a diameter of 15.5 mm and a thickness of 0.5 mm)
Kapton ring (having an outer diameter of 16.4 mm, an inner diameter of 8 mm, and a thickness of 0.05 mm)
Gasket
Sample
Lower lid In assembling the coin cell, the sample was impregnated with 10 μL of an electrolyte. The electrolyte was an electrolyte (i) obtained by dissolving LiBF$_4$ in a mixed solvent of propylene carbonate and NIKKOL BT-12 (manufactured by Nikko Chemicals Co., Ltd.) which were mixed at a ratio (volume ratio) of 91.5:8.5 and (ii) having an LiBF$_4$ concentration of 1.0 mol/L. The electrolyte had a temperature of 25° C. during production of the coin cell for measurement.

The temperature inside the produced coin cell for measurement was raised from room temperature to 150° C. at 15° C./min. During the raise in temperature, the temperature inside the coin cell for measurement was continuously measured with use of a digital multimeter (7352A manufactured by ADC CORPORATION). Further, a resistance value at 1 kHz of the coin cell for measurement was continuously measured with use of an LCR meter (IM3523, manufactured by HIOKI E.E. CORPORATION).

A graph was made which shows a relationship between the temperature inside the coin cell for measurement and the resistance value at 1 kHz of the coin cell for measurement. In this graph, an intersection of (i) a tangent line at a point at which the resistance value had reached 2000Ω and (ii) the base line before a significant increase in resistance was regarded as a shutdown temperature of the nonaqueous electrolyte secondary battery separator.

(5) Puncture Strength

A KES-G5 handy compression tester manufactured by KATO TECH CO., LTD. was used to carry out a puncture test with a needle tip curvature radius of 0.5 mm and at a puncture speed of 3.3 mm/sec, and a maximum puncture load (N) was regarded as a puncture strength of the nonaqueous electrolyte secondary battery separator. The sample, together with a silicone rubber gasket, was clamped and fixed to a metallic flask (sample holder) provided with a hole having a diameter of 11.3 mm.

(6) Air Permeability

A sample of 60 mm×60 mm was cut out from the nonaqueous electrolyte secondary battery separator. The sample was sandwiched between measurement sections of a Digital Oken Type Air-Permeability tester (EGO1 manufactured by ASAHI SEIKO CO., LTD.) to measure an air permeability (s/100 mL).

(7) Measurement of Molecular Weight

A gel chromatography instrument (Alliance GPC2000 manufactured by Waters Corporation) was used as a measuring device to measure a molecular weight of polyolefin contained in a porous film. The measurement was carried out under the following conditions.

Column: TSKgel GMHHR-H (S) HT 30 cm×2, TSKgel GMH6-HTL 30 cm×2, manufactured by Tosoh Corporation
Mobile phase: o-dichlorobenzene
Detector: differential refractometer
Flow rate: 1.0 mL/min
Column temperature: 140° C.
Injection volume: 500 μL After 30 mg of the sample was completely dissolved in 20 mL of o-dichlorobenzene at 145° C., the resultant solution was filtered through a sintered filter (having a pore size of 0.45 μm), and the resultant filtrate was used for analysis. A calibration curve was produced with use of 16 standard polystyrenes having known molecular weights.

(8) Measurement of Degree of Branching

A carbon nuclear magnetic resonance (13C NMR) spectrum of a polyolefin-based resin was measured under the following conditions.

Device: AVANCEIII 600HD manufactured by Bruker BioSpin K.K.
Measurement probe: 10 mm cryoprobe
Solvent for measurement: mixed solution of 1,2-dichlorobenzene and 1,1,2,2-tetrachloroethane-d2 at a volume ratio of 85/15
Sample concentration: 20 mg/mL
Measurement temperature: 135° C.
Measurement method: proton decoupling method Number of times of accumulation: 3000 times
Pulse width: 45°
Pulse repetition time: 4 seconds
Measurement reference: tetramethylsilane In the 13C NMR spectrum obtained, the sum total of all peaks observed at 5 ppm to 50 ppm was assumed to be 1000. Next, the sum total of accumulated values of peaks having tops near 33.1 ppm to 33.3 ppm, 38.1 ppm to 38.3 ppm, or 39.7 ppm to 39.9 ppm was regarded as a degree of branching of the polyolefin-based resin.

[Material Polyolefin]

In the present Examples, high molecular weight polyethylenes (polyethylenes A1 to A3) and low molecular weight polyethylenes (polyethylenes B1 to B3) were mixed to produce nonaqueous electrolyte secondary battery separators. The polyethylenes A1 to A3 and the polyethylenes B1 to B3 are as follows:

Polyethylene A1: having a Mw of 5.06 million and a degree of branching of 0.1 branches per 1000 carbon atoms Polyethylene A2: having a Mw of 2.44 million and a degree of branching of 0.6 branches per 1000 carbon atoms Polyethylene A3: having a Mw of 4.79 million and a degree of branching of 0.4 branches per 1000 carbon atoms Polyethylene B1: having a Mw of 2000 and a melting point of 127° C.

Polyethylene B2: having a Mw of 4000 and a melting point of 132° C.

Polyethylene B3: having a Mw of 1000 and a melting point of 107° C.

Example 1

A Henschel mixer was used to mix 100 parts by weight of the polyethylene A1, 43 parts by weight of the polyethylene B1, and 170 parts by weight of calcium carbonate (manufactured by MARUO CALCIUM CO., LTD and having an average particle diameter (as measured by SEM) of 0.07 μm). A twin-screw kneader was used to knead the resultant mixture to obtain a mixture. A roller was used to roll the obtained mixture to form the mixture into a film.

The film was immersed in an aqueous hydrochloric acid solution (containing 2 mol/L to 4 mol/L of hydrochloric acid and 0.1% by weight to 0.5% by weight of a nonionic surfactant) for 6 minutes to remove calcium carbonate. Next, the film was immersed in an aqueous sodium hydroxide solution (containing 0.1 mol/L to 2 mol/L of sodium hydroxide) for 1 minute so as to be neutralized. Subsequently, the film was immersed in water for 5 minutes so as to be cleaned. Then, the film was brought into contact with a drying drum and heated at 50° C. so as to be dried. The dried film was wound by a winding machine.

The wound film was stretched 7-fold in a transverse direction (TD direction) at a stretch temperature of 100° C. Next, the film thus stretched was subjected to a heat fixation treatment at a heat fixation temperature of 130° C. Example 1 thus obtained a nonaqueous electrolyte secondary battery separator (1).

Example 2

The makeup of a polyolefin-based resin composition was changed to 100 parts by weight of the polyethylene A1, 43 parts by weight of the polyethylene B2, and 170 parts by weight of calcium carbonate. Except for the above, Example obtained a nonaqueous electrolyte secondary battery separator (2) by a process similar to that of Example 1.

Example 3

The makeup of a polyolefin-based resin composition was changed to 100 parts by weight of the polyethylene A2, 43 parts by weight of the polyethylene B1, and 170 parts by weight of calcium carbonate. Except for the above, Example obtained a nonaqueous electrolyte secondary battery separator (3) by a process similar to that of Example 1.

Example 4

The makeup of a polyolefin-based resin composition was changed to 100 parts by weight of the polyethylene A3, 43 parts by weight of the polyethylene B1, and 170 parts by weight of calcium carbonate. Except for the above, Example obtained a nonaqueous electrolyte secondary battery separator (4) by a process similar to that of Example 1.

Comparative Example 1

The makeup of a polyolefin-based resin composition was changed to 100 parts by weight of the polyethylene A3, 43 parts by weight of the polyethylene B3, and 170 parts by weight of calcium carbonate. Except for the above, Comparative Example 1 obtained a comparative nonaqueous electrolyte secondary battery separator (1) by a process similar to that of Example 1.

TABLE 1

| | Composition | Maximum heating value (mW/g) | Enthalpy of fusion (J/g) | Melting point (° C.) | Film thickness (μm) | Weight per unit area (g/m$^2$) | Shutdown temperature (° C.) | Puncture strength (gf/13 μm) | Air permeability (s/100 cc) |
|---|---|---|---|---|---|---|---|---|---|
| Example 1 | A1/B1 = 100:43 | 47.2 | 222 | 140.4 | 13.0 | 5.9 | 136.4 | 399 | 152 |
| Example 2 | A1/B2 = 100:43 | 64.4 | 221 | 142.3 | 13.0 | 5.9 | 136.7 | 423 | 138 |
| Example 3 | A2/B1 = 100:43 | 43.8 | 226 | 140.9 | 13.0 | 5.9 | 134.7 | 390 | 137 |
| Example 4 | A3/B1 = 100:43 | 31.7 | 216 | 139.8 | 13.0 | 5.9 | 136.6 | 394 | 137 |
| Comparative Example 1 | A3/B3 = 100:43 | 23.8 | 222 | 138.0 | 13.1 | 5.9 | 135.7 | 338 | 133 |

[Results]

Table 1 shows results of measurement of physical properties of the nonaqueous electrolyte secondary battery separators (1) to (4) and the comparative nonaqueous electrolyte secondary battery separator (1). As shown in Table 1, the nonaqueous electrolyte secondary battery separators (1) to (4) and the comparative nonaqueous electrolyte secondary battery separator (1) were adjusted so as to be substantially identical in film thickness and in weight per unit area. Furthermore, the nonaqueous electrolyte secondary battery separators (1) to (4) and the comparative nonaqueous electrolyte secondary battery separator (1) are substantially equal in shutdown temperature around 135° C. and in air permeability around 140 s/100 mL.

In contrast, Examples and Comparative Example were observed to greatly differ in puncture strength. Specifically, the nonaqueous electrolyte secondary battery separators (1) to (4) each had a puncture strength of not less than 350 gf/13 μm, whereas the comparative nonaqueous electrolyte secondary battery separator (1) had a puncture strength of less than 350 gf/13 μm.

Moreover, a nonaqueous electrolyte secondary battery separator having a higher maximum heating value was observed to tend to have a higher puncture strength. Since Examples and Comparative Example are substantially equal in shutdown temperature and in air permeability, the nonaqueous electrolyte secondary battery separator having a higher maximum heating value can be said to be a nonaqueous electrolyte secondary battery separator whose shutdown temperature, mechanical strength, and ion permeability are well-balanced.

Note that a microporous film disclosed in Examples of Patent Literature 1 has a film thickness of 25 μm and has a Gurley value of at least 605 s/100 mL. That is, the microporous film of Patent Literature 1 can be said to be significantly inferior in ion permeability to the nonaqueous electrolyte secondary battery separators (1) to (4). The microporous polyethylene film disclosed in Patent Literature 2 has a film thickness of 25 μm and has a puncture strength of at most 585 gf. That is, the microporous polyethylene film of Patent Literature 2 can be said to be significantly inferior in mechanical strength to the nonaqueous electrolyte secondary battery separators (1) to (4).

INDUSTRIAL APPLICABILITY

The present invention can be used in, for example, a nonaqueous electrolyte secondary battery.

The invention claimed is:

1. A nonaqueous electrolyte secondary battery separator comprising a polyolefin-based resin as a main component,
the nonaqueous electrolyte secondary battery separator having a maximum heating value of not less than 30 mW/g observed during isothermal crystallization of the nonaqueous electrolyte secondary battery separator at 128° C.;
the nonaqueous electrolyte secondary battery separator having a puncture strength of not less than 350 gf/13 μm, wherein the puncture strength is obtained by converting a film thickness of the nonaqueous electrolyte secondary battery separator into 13 μm;
the nonaqueous electrolyte secondary battery separator having a Gurley value of not more than 152 s/100 cc/13 μm, wherein the Gurley value is obtained by converting the film thickness into 13 μm; and
the nonaqueous electrolyte secondary battery separator having a shutdown temperature of not more than 136.7° C.

2. The nonaqueous electrolyte secondary battery separator as set forth in claim 1, wherein the nonaqueous electrolyte secondary battery separator contains a polyethylene-based resin as the main component.

3. A nonaqueous electrolyte secondary battery laminated separator comprising:
a nonaqueous electrolyte secondary battery separator recited in claim 1; and
a porous layer disposed on one surface or on both surfaces of the nonaqueous electrolyte secondary battery separator,
the porous layer containing at least one resin that is selected from the group consisting of a meth(acrylate)-based resin, a fluorine-containing resin, a polyamide-based resin, a polyimide-based resin, a polyamideimide-based resin, a polyester-based resin, and a water-soluble polymer.

4. The nonaqueous electrolyte secondary battery laminated separator as set forth in claim 3, wherein the porous layer contains an aramid resin.

5. A nonaqueous electrolyte secondary battery member comprising:
a positive electrode;
a nonaqueous electrolyte secondary battery separator recited in claim 1; and
a negative electrode,
the positive electrode, the nonaqueous electrolyte secondary battery separator, and the negative electrode being disposed in this order.

6. A nonaqueous electrolyte secondary battery comprising a nonaqueous electrolyte secondary battery separator recited in claim 1.

7. A nonaqueous electrolyte secondary battery member comprising:
a positive electrode;
a nonaqueous electrolyte secondary battery laminated separator recited in claim 3; and
a negative electrode,
the positive electrode, the nonaqueous electrolyte secondary battery laminated separator, and the negative electrode being disposed in this order.

8. A nonaqueous electrolyte secondary battery comprising a nonaqueous electrolyte secondary battery laminated separator recited in claim 3.

9. A nonaqueous electrolyte secondary battery comprising a nonaqueous electrolyte secondary battery member recited in claim 5.

10. A nonaqueous electrolyte secondary battery comprising a nonaqueous electrolyte secondary battery member recited in claim 7.

* * * * *